US012659556B2

(12) United States Patent
Wang et al.

(10) Patent No.: US 12,659,556 B2
(45) Date of Patent: Jun. 16, 2026

(54) CAMERA DEVICE HAVING A STEPPER MOTOR DRIVING A MOVABLE MEMBER

(71) Applicant: Chicony Electronics Co., Ltd., New Taipei City (TW)

(72) Inventors: Tsung-You Wang, New Taipei City (TW); Yi-Sing Jiang, New Taipei City (TW)

(73) Assignee: CHICONY ELECTRONICS CO., LTD., New Taipei City (TW)

( * ) Notice: Subject to any disclaimer, the term of this patent is extended or adjusted under 35 U.S.C. 154(b) by 47 days.

(21) Appl. No.: 18/806,356

(22) Filed: Aug. 15, 2024

(65) Prior Publication Data

US 2025/0254404 A1     Aug. 7, 2025

(30) Foreign Application Priority Data

Feb. 6, 2024     (TW) .................................. 113104817

(51) Int. Cl.
| | |
|---|---|
| *H04N 23/11* | (2023.01) |
| *G03B 17/12* | (2021.01) |
| *H04N 7/18* | (2006.01) |
| *H04N 23/12* | (2023.01) |
| *H04N 23/50* | (2023.01) |

(52) U.S. Cl.
CPC ............. *H04N 23/11* (2023.01); *G03B 17/12* (2013.01); *H04N 23/12* (2023.01); *H04N 23/50* (2023.01); *H04N 7/18* (2013.01)

(58) Field of Classification Search
CPC ........ H04N 23/11; H04N 23/12; H04N 23/50; H04N 7/18; H04N 7/183; H04N 23/00; H04N 23/54; H04N 23/55; G03B 17/12; G03B 5/00; G03B 11/00
See application file for complete search history.

(56) References Cited

U.S. PATENT DOCUMENTS

| | | | | |
|---|---|---|---|---|
| 7,973,284 B2 * | 7/2011 | Chiang | .................. | H04N 1/482 |
| | | | | 250/330 |
| 2006/0077284 A1 * | 4/2006 | Kurosawa | .............. | H04N 23/74 |
| | | | | 348/E5.038 |
| 2007/0291157 A1 * | 12/2007 | Ding | ...................... | H04N 23/55 |
| | | | | 348/E5.09 |
| 2012/0320202 A1 * | 12/2012 | Qian | .................... | G02B 26/023 |
| | | | | 359/889 |
| 2020/0329180 A1 * | 10/2020 | Fujiwara | ................ | H04N 23/55 |

FOREIGN PATENT DOCUMENTS

| | | |
|---|---|---|
| CN | 107908059 A | 4/2018 |
| TW | 201826000 A | 7/2018 |

* cited by examiner

*Primary Examiner* — Gevell V Selby
(74) *Attorney, Agent, or Firm* — MUNCY, GEISSLER, OLDS & LOWE, P.C.

(57) ABSTRACT

A camera device includes a circuit board, a movable member, and a stepper motor. The circuit board has a photosensitive element, and the photosensitive element has a photosensitive surface. The movable member is on the circuit board, and the movable member includes an infrared filter. The stepper motor is directly or indirectly connected to the movable member, and the stepper motor is configured to drive the movable member to move between a first position and a second position with respect to the circuit board. When the movable member is at the first position, the infrared filter covers the photosensitive surface; when the movable member is at the second position, the infrared filter does not cover the photosensitive surface.

9 Claims, 6 Drawing Sheets

CAMERA DEVICE HAVING A STEPPER MOTOR DRIVING A MOVABLE MEMBER

CROSS-REFERENCE TO RELATED APPLICATION

This non-provisional application claims priority under 35 U.S.C. § 119 (a) to patent application No. 113104817 filed in Taiwan, R.O.C. on Feb. 6, 2024, the entire contents of which are hereby incorporated by reference.

BACKGROUND

Technical Field

The instant disclosure relates to an optical device, in particular, to a camera device.

Related Art

Along with developments of technology, camera devices are widely used in different fields. For example, a camera device may be installed to a residence, an office, or a commercial building, so that the camera device can perform the security surveillance function or record personnel activities.

SUMMARY

However, as compared with naked eyes, the photosensitive element of the camera device can detect lights with a wider range of wavelengths (for example, the photosensitive element can detect infrared lights having a wavelength equal to or greater than 700 nm), therefore, in the case that the visible lights is sufficient (for example, during the daytime), the infrared rays in the lights will cause the color of the image sensed by the photosensitive element to deviated. As a result, the image sensed by the photosensitive element is different from the image actually seen by human's naked eyes.

In view of this, in one embodiment, a camera device is provided. The camera device comprises a circuit board, a movable member, and a stepper motor. The circuit board has a photosensitive element, and the photosensitive element has a photosensitive surface. The movable member is on the circuit board, and the movable member comprises an infrared filter. The stepper motor is directly or indirectly connected to the movable member, and the stepper motor is configured to drive the movable member to move between a first position and a second position with respect to the circuit board. When the movable member is at the first position, the infrared filter covers the photosensitive surface; when the movable member is at the second position, the infrared filter does not cover the photosensitive surface.

As above, according to the camera device of one or some embodiments of the instant disclosure, depending on users demands, the movable member can be moved with respect the circuit board through the driving of the stepper motor, so that the infrared filter can be switched to cover the photosensitive surface of the photosensitive element or not. Therefore, the performance of the camera device can be improved, so that the camera device can provide a better quality for the images under different light environments. Moreover, according to the camera device of one or some embodiments of the instant disclosure, by taking the stepper motor as the driving source, the noise upon switching the infrared filter can be greatly reduced, thereby preventing influencing personnel in the application environment.

BRIEF DESCRIPTION OF THE DRAWINGS

The disclosure will become more fully understood from the detailed description given herein below for illustration only, and thus not limitative of the disclosure, wherein.

DETAILED DESCRIPTION

It is noted that, in the embodiments, the terms "first" and "second" are provided to describe different elements, and these elements are not thus limited by using these terms. In all the figures, identical symbols are used to denote identical or similar elements.

Figure 1:
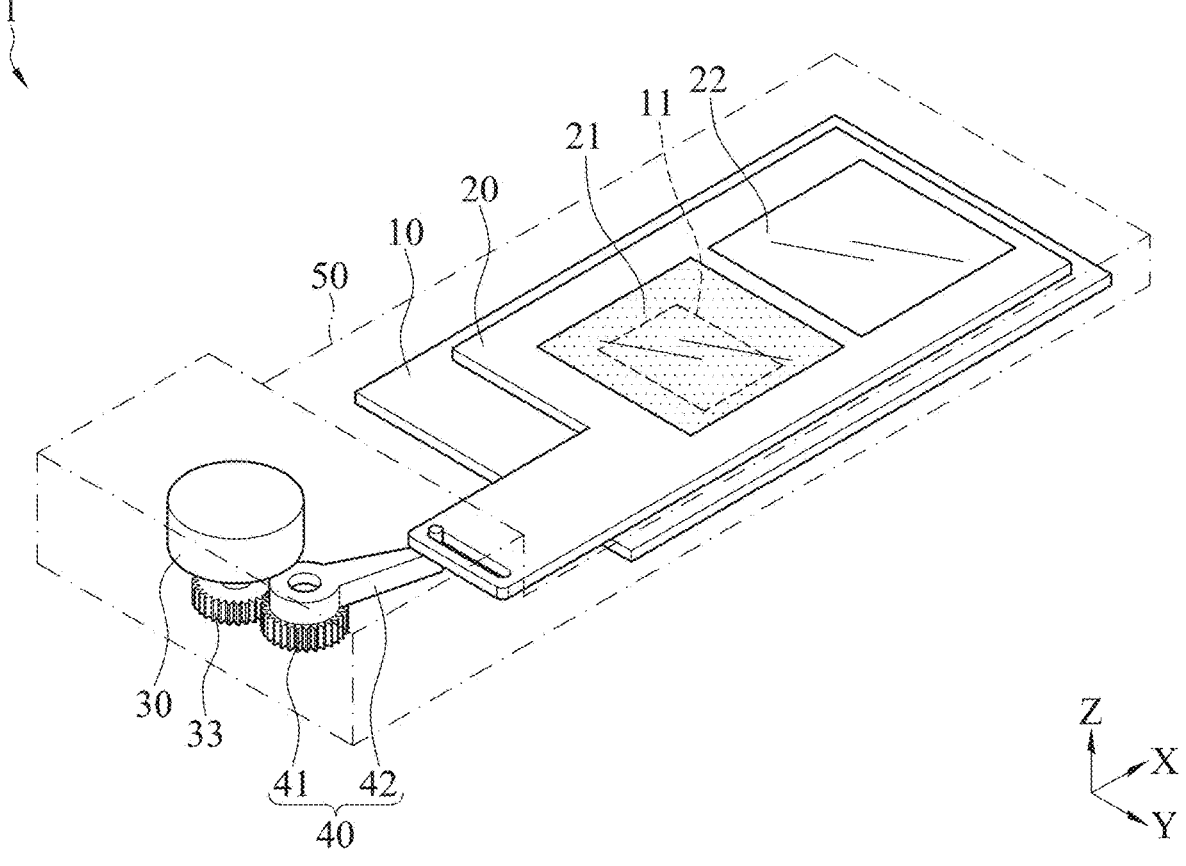
FIG. 1 illustrates a perspective view of a camera device according to a first embodiment of the instant disclosure.
Figure 2:
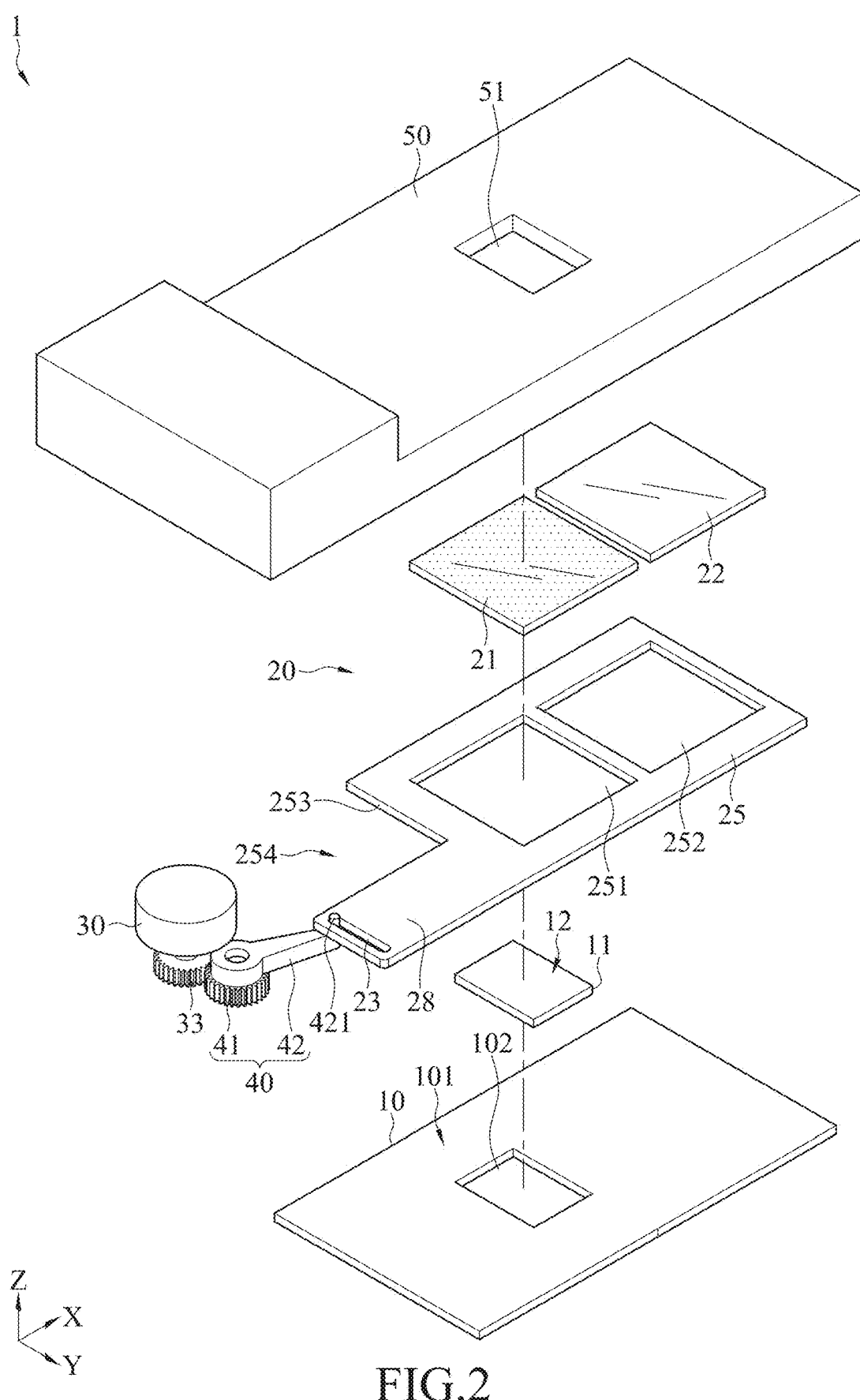
FIG. 2 illustrates an exploded view of the camera device of the first embodiment of the instant disclosure.

FIG. 1 illustrates a perspective view of a camera device according to a first embodiment of the instant disclosure. FIG. 2 illustrates an exploded view of the camera device of the first embodiment of the instant disclosure. As shown in FIG. 1 and FIG. 2, in this embodiment, the camera device 1 comprises a circuit board 10, a movable member 20, and a stepper motor 30. In some embodiments, the camera device 1 may be an IP camera, a closed-circuit television (CCTV), or an analog surveillance camera, and the camera device 1 is adapted to be assembled at different places (e.g., a bedroom, a kinder garden, an office, or a store), thus the camera device 1 can perform the security surveillance function or record personnel activities. Alternatively, in some embodiments, the camera device 1 may be assembled on different kinds of products; for example, the camera device 1 may be assembled on vehicles or mobile devices (e.g., smart phones, tablet computers, or notebook computers), and the instant disclosure is not limited thereto.

As shown in FIG. 1 and FIG. 2, the camera device 1 comprises a housing 50, and the circuit board 10 is in the housing 50. For example, the circuit board 10 may be fixed in the housing 50 through locking, adhering, engaging, or other manners. The circuit board 10 has a photosensitive element 11. In this embodiment, the circuit board 10 has an inner surface 101, the inner surface 101 has an assembling hole 102, and the photosensitive element 11 is in the assembling hole 102 to reduce the overall thickness of the circuit board 10. For example, the outer periphery of the photosensitive element 11 may be adhered and fixed to the inner periphery of the assembling hole 102, but the instant disclosure is not limited thereto. In some other embodiments, the photosensitive element 11 may be directly stacked on the inner surface 101 of the circuit board 10.

As shown in FIG. 1 and FIG. 2, the photosensitive element 11 has a photosensitive surface 12. The photosensitive surface 12 is configured to detect external lights to generate image signals. In this embodiment, the housing 50 has a light transmissive hole 51, and the position of the light transmissive hole 51 corresponds to the position of the photosensitive surface 12. Therefore, external lights outside the camera device 1 can enter the housing 50 through the light transmissive hole 51 and thus can be transmitted to the photosensitive surface 12 of the photosensitive element 11.

In some embodiments, specifically, the photosensitive element 11 may be a charge-coupled device (CCD), a complementary metal-oxide semiconductor (CMOS), or a CMOS active pixel sensor.

As shown in FIG. 1 and FIG. 2, the movable member 20 is movably disposed in the housing 50, and the movable member 20 is above the circuit board 10 and is between the light transmissive hole 51 of the housing 50 and the photosensitive element 11. The movable member 20 comprises an infrared filter 21. For example, in this embodiment, the movable member 20 comprises a substrate 25, the substrate 25 has a first hollow hole 251, and the infrared filter 21 is fixed in the first hollow hole 251.

Figure 3:
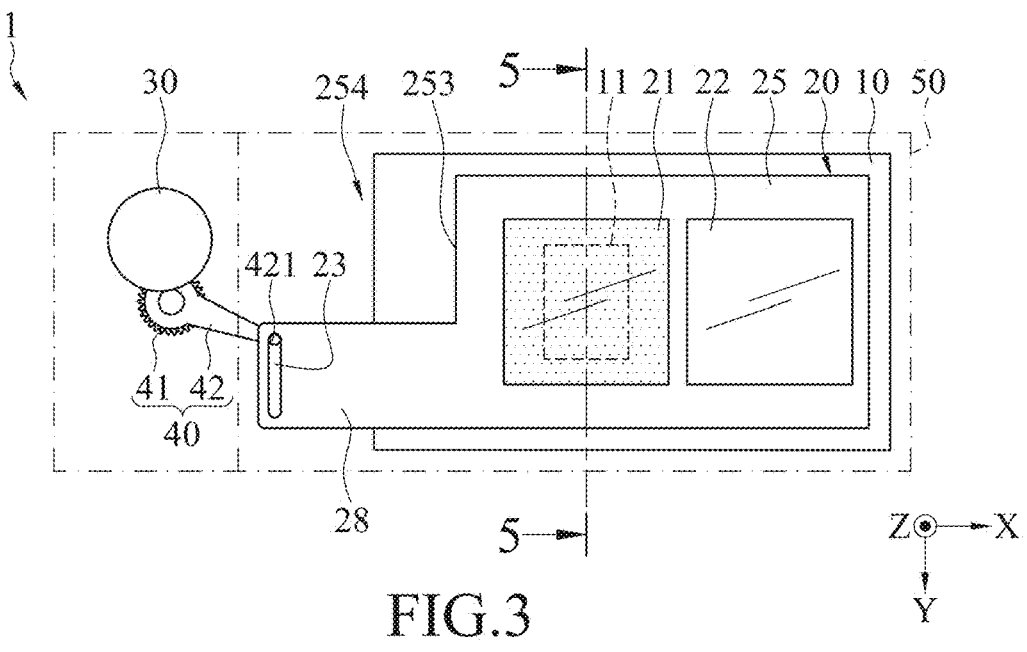
FIG. 3 illustrates a plan view of the camera device of the first embodiment of the instant disclosure.
Figure 4:
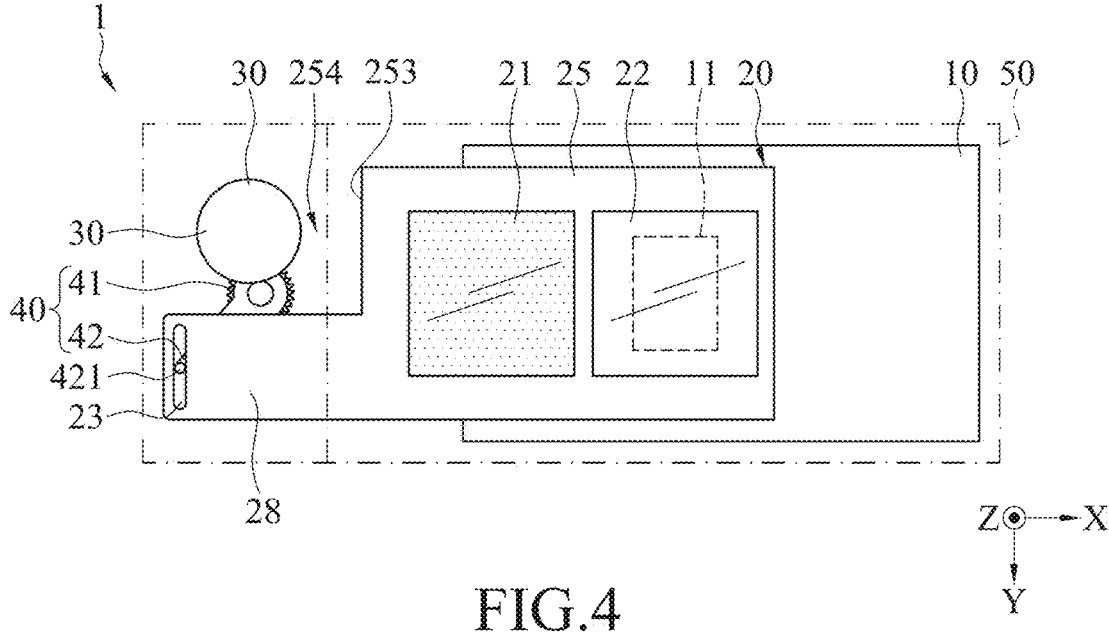
FIG. 4 illustrates a schematic view showing the switching operation of the camera device of the first embodiment of the instant disclosure.

FIG. 3 illustrates a plan view of the camera device of the first embodiment of the instant disclosure. FIG. 4 illustrates a schematic view showing the switching operation of the camera device of the first embodiment of the instant disclosure. As shown in FIG. 1 to FIG. 4, the stepper motor 30 is connected to the movable member 20 to drive the movable member 20 to move between a first position (the position shown in FIG. 3) and a second position (the position shown in FIG. 4) with respect to the circuit board 10. Furthermore, the stepper motor 30 may be directly or indirectly connected to the movable member 20. For example, the stepper motor 30 may be indirectly connected to the movable member 20 through a transmission member 40. For instance, the transmission member 40 may be a gear transmission mechanism, a worm wheel-worm screw mechanism, or a cam mechanism, but the instant disclosure is not limited thereto.

As shown in FIG. 1 to FIG. 4, in this embodiment, the stepper motor 30 comprises a driving gear 33, the transmission member 40 comprises a driven gear 41 and a swing arm 42. The driving gear 33 is engaged with the driven gear 41, one of two ends of the swing arm 42 is connected to the driven gear 41, and the other end of the swing arm 42 has a guiding post 421. The movable member 20 comprises an extension plate 28, and the substrate 25 has a side edge 253. The extension plate 28 integrally extends from the side edge 253, the extension plate 28 has an elongated groove 23, and the guiding post of the swing arm 42 is slidably and pivotally disposed in the elongated groove 23. The movable member 20 has a moving direction (in this embodiment, the X axis direction), and the elongated groove 23 has an extension direction (in this embodiment, the Y axis direction). In one embodiment, the extension direction is perpendicular to the moving direction, but the instant disclosure is not limited thereto. In some embodiments, the angle between the extension direction of the elongated groove 23 and the moving direction of the movable member 20 may be in a range between 0 degree and 180 degrees. Therefore, according to one or some embodiments of the instant disclosure, when the stepper motor 30 activates to drive the driving gear 33 to rotate clockwise or counterclockwise, the driving gear 33 then drives the driven gear 41 to rotate, so that the swing arm 42 swings by taking the center of the driven gear 41 as an axis and the guiding post 421 of the swing arm 42 slides along the extension direction of the elongated grove 23. Therefore, the guiding post 421 can drive the movable member 20 to move linearly (in this embodiment, along the X axis direction) from the first position to the second position.

As shown in FIG. 2 and FIG. 3, when the movable member 20 is moved to the first position, the infrared filter 21 of the movable member 20 covers the photosensitive surface 12, so that the external lights firstly pass through the infrared filter 21 and then is transmitted to the photosensitive surface 12 of the photosensitive element 11. In contrast, when the movable member 20 is moved from the first position to the second position, the infrared filter 21 does not cover the photosensitive surface 12 of the photosensitive element 10. Moreover, in this embodiment, the extension plate 28 is adjacent to one end of the side edge 253 of the substrate 25, so that a notch 254 is formed between the side edge 253 and the extension plate 28. When the movable member 20 is moved to the first position, the stepper motor 30 is outside the notch 254; During the process that the movable member 20 is moved from the first position to the second position, the movable member 20 is moved toward the stepper motor 30, so that the stepper motor 30 is within the notch 254. Therefore, according to some embodiments, the stepper motor 30 is disposed within the region where the movable member 20 can be moved, so that the space within the housing 50 can be utilized effectively.

As above, according to the camera device 1 of one or some embodiments of the instant disclosure, depending on users demands, the infrared filter 21 can be controlled to cover the photosensitive surface 12 of the photosensitive element 11 or not. Therefore, the camera device 1 can provide a better quality for the images under different light environments. For example, the stepper motor 30 may be electrically connected to a processor (not shown), the processor can determine whether the camera device 1 is under an environment with sufficient visible lights. When the camera device 1 is under an environment with sufficient visible lights (for example, during daytime), the processor can control the stepper motor 30 to drive the movable member 20 to move to the first position, so that the infrared lights in the external lights can be filtered through the infrared filter 21, and the image detected by the photosensitive element 10 can present real colors of the object. When the camera device 1 is under an environment with insufficient visible lights (for example, during nighttime), the processor can control the stepper motor 30 to move the movable member 20 to the second position, so that the photosensitive element 11 is not covered by the infrared filter 21, and the photosensitive element 11 can provide the image through the detection of infrared lights.

Moreover, according to the camera device 2 of one or some embodiments of the instant disclosure, because the stepper angle of the stepper motor 30 is small, the stepper motor 30 can perform a relatively smoother movement, by taking the stepper motor 30 as the driving source, the noise upon switching the infrared filter 21 can be greatly reduced, thereby preventing influencing personnel in the application environment. For example, in the case that the camera device 1 is installed in a bedroom, the noise generated during switching the infrared filter 21 can be prevented from influencing user's sleep or from scaring baby and children.

Figure 5:
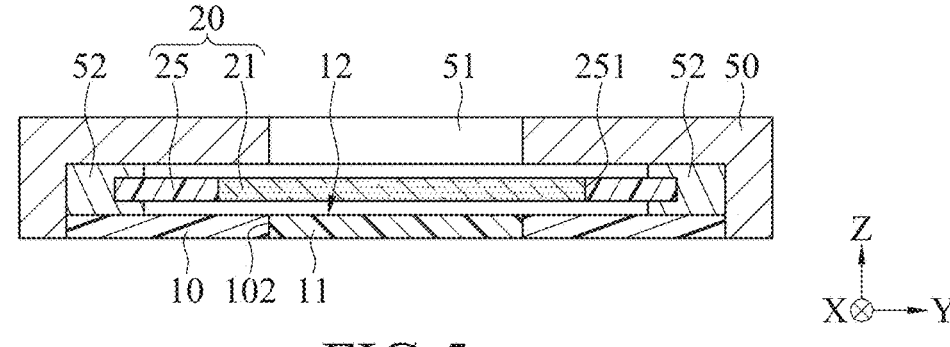
FIG. 5 illustrates a cross-sectional view along line 5-5 shown in FIG. 3.

FIG. 5 illustrates a cross-sectional view along line 5-5 shown in FIG. 3. As shown in FIG. 3 and FIG. 5, in this embodiment, a plurality of guiding members 52 may be disposed in the housing 50. For example, the guiding members 52 may be guiding rails respectively adjacent to two opposite sides of the housing 50, and the extension direction of the guiding members 52 is the same as the moving direction of the movable member 20 (in this embodiment, the X axis direction). The two sides of the movable member 20 are respectively assembled with the guiding members 52, so that the movable member 52 is ensured to move along the extension direction of the guiding members 52 linearly, thereby preventing the deflection of the movable member 20 during the movement.

Further, as shown in FIG. 1 to FIG. 4, in this embodiment, the movable member 20 further comprises a light transmissive sheet 22, and the substrate 25 of the movable members 20 further has a second hollow hole 252. The first hollow hole 251 and the second hollow hole 252 are spaced apart from each other, and the light transmissive sheet 22 is in the second hollow hole 252, so that the light transmissive sheet 22 and the infrared filter 21 can be disposed on the same plate (in this embodiment, the substrate 25). Moreover, when the movable member 20 is moved to the second position (the position shown in FIG. 4), the light transmissive sheet 22 covers the photosensitive surface 12 of the photosensitive element 11 to increase the light transmission of the external lights and to reduce light reflection and scattering. Therefore, when the camera device 1 is under an environment with insufficient visible lights, the brightness and clearness of the image captured by the camera device 1 can be improved effectively.

As shown in FIG. 1 to FIG. 4, in this embodiment, the area of the light transmissive sheet 22 and the area of the infrared filter 21 are both greater than the area of the photosensitive surface 12 of the photosensitive element 11, thus ensuring that the infrared filter 21 can cover the photosensitive surface 12 when the movable member 20 is at the first position and that the light transmissive sheet 22 can cover the photosensitive surface 12 when the movable member 20 is at the second position. In some embodiments, the light transmissive sheet 22 may be provided with an optical coating; for example, the optical coating may be an anti-reflective (AR) coating, so that the light transmissive sheet 22 can reduce the light reflection and increase light transmission rate, thereby further increasing the brightness and the clearness of the image captured by the camera device 1.

In some embodiments, for the stepper motor 30 of the camera device 1, instead of being indirectly connected to the movable member 20 through the transmission member 40, the stepper motor 30 may be directly connected to the movable member and the transmission member 40 is thus omitted. The embodiments are described as below with accompanying figures.

Figure 6:
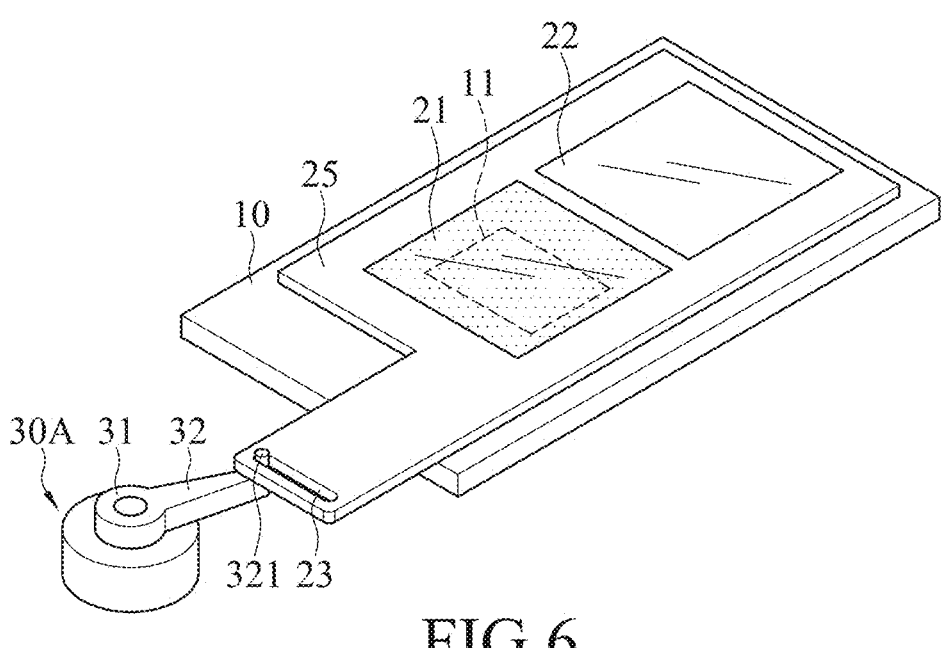
FIG. 6 illustrates a perspective view of a camera device according to a second embodiment of the instant disclosure.

FIG. 6 illustrates a perspective view of a camera device according to a second embodiment of the instant disclosure. As shown in FIG. 6, in the second embodiment, the stepper motor 30A comprises a shaft 31 and a swing arm 32, one of two ends of the swing arm 32 is connected to the shaft 31, and the other end of the swing arm 32 has a guiding post 321. One side of the movable member 20 has an elongated groove 232, and the guiding post 321 of the swing arm 32 of the stepper motor 30A is slidably and directly pivotally disposed in the elongated groove 23. Therefore, when the stepper motor 30A activates to drive the shaft 31 to rotate clockwise or counterclockwise, the swing arm 32 of the stepper motor 30A swings by taking the center of the shaft 31 as an axis and the guiding post 321 of the swing arm 32 slides along the extension direction of the elongated grove

23. Therefore, the guiding post 321 of the stepper motor 30A can drive the movable member 20 to move linearly from the first position to the second position.

Figure 7:
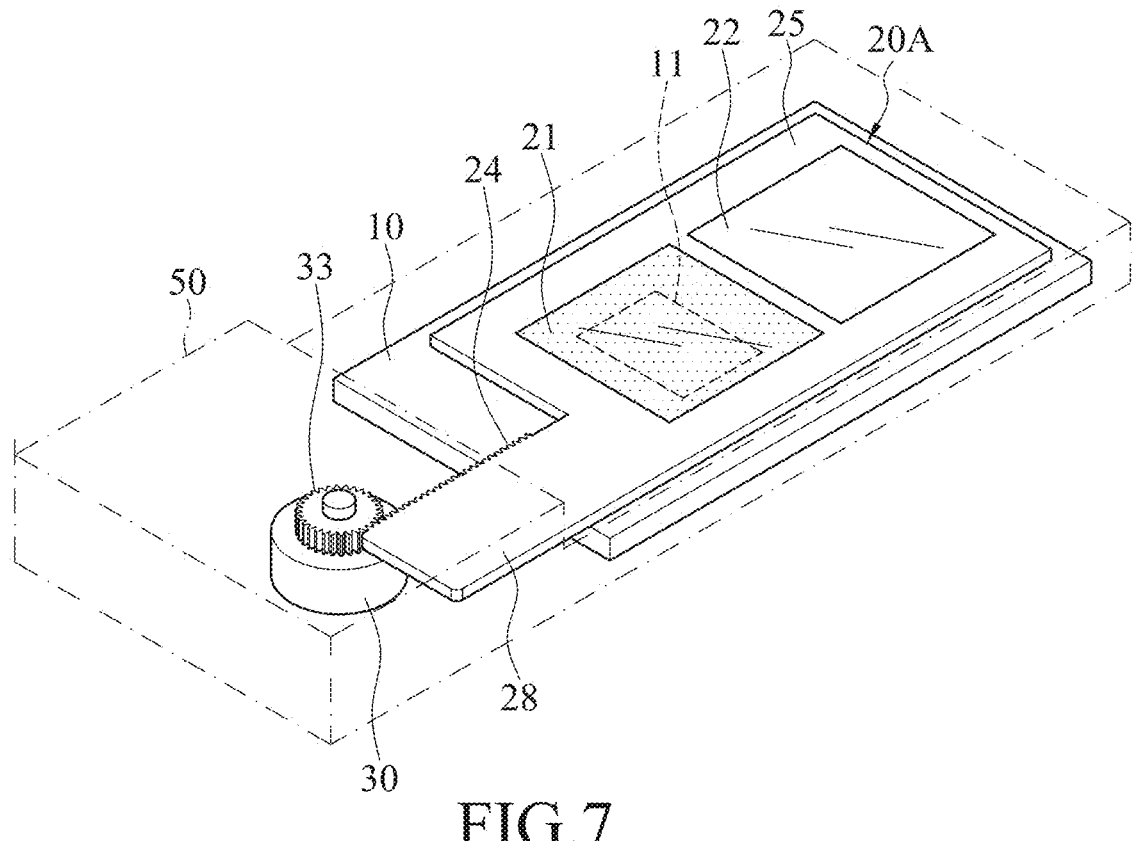
FIG. 7 illustrates a perspective view of a camera device according to a third embodiment of the instant disclosure.

FIG. 7 illustrates a perspective view of a camera device according to a third embodiment of the instant disclosure. As shown in FIG. 7, in the third embodiment, one side of the movable member 20A has a rack 24. In this embodiment, the rack 24 is on the extension plate 28 of the movable member 20A, and the driving gear 33 of the stepper motor 30 is directly engaged with the rack 24 of the movable member 20A. Therefore, when the stepper motor 30 activates to drive the driving gear 33 to rotate, the driving gear 33 of the stepper motor 30 can directly drive the movable member 20A to move linearly to the first position or the second position with respect to the circuit board 10 through the rack 24.

Figure 8:
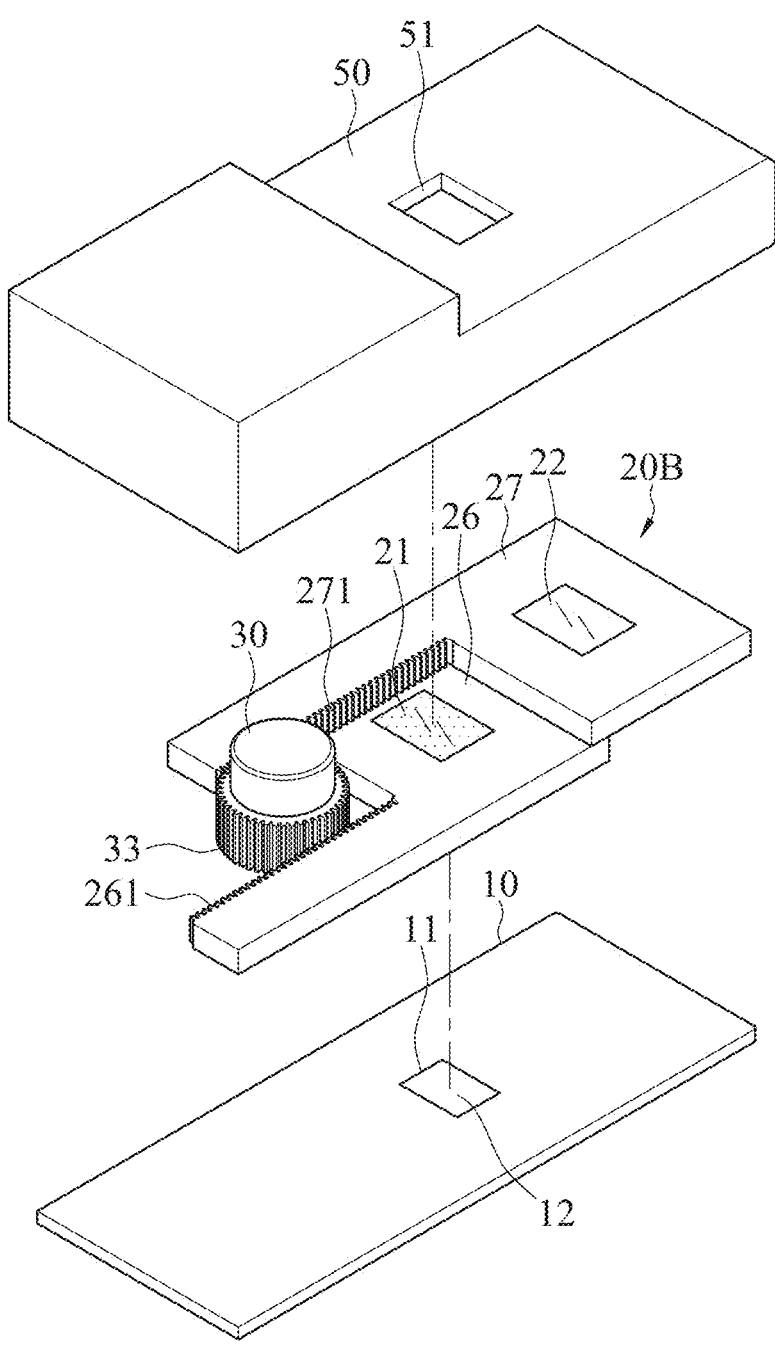
FIG. 8 illustrates a perspective view of a camera device according to a fourth embodiment of the instant disclosure.
Figures 9, 10:
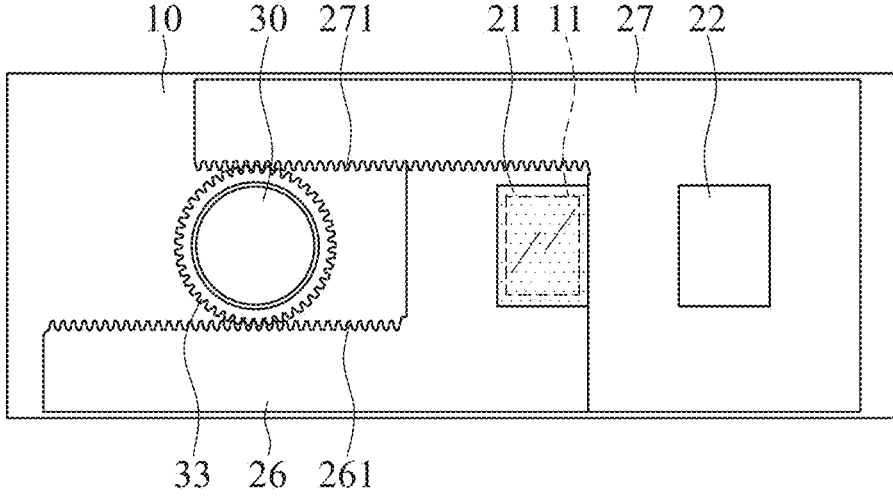
FIG. 9 illustrates a plan view of the camera device of the fourth embodiment of the instant disclosure.
FIG. 10 illustrates a schematic view showing the switching operation of the camera device of the fourth embodiment of the instant disclosure.

FIG. 8 illustrates a perspective view of a camera device according to a fourth embodiment of the instant disclosure. FIG. 9 illustrates a plan view of the camera device of the fourth embodiment of the instant disclosure. FIG. 10 illustrates a schematic view showing the switching operation of the camera device of the fourth embodiment of the instant disclosure. As shown in FIG. 8 to FIG. 10, in the fourth embodiment, the movable member 20B comprises a first substrate 26 and a second substrate 27 stacked with each other. The infrared filter 21 is on the first substrate 26, and the light transmissive sheet 22 is on the second substrate 27. The stepper motor 30 comprises a driving gear 33, the first substrate 26 has a first rack 261, the second substrate 27 has a second rack 271, and the first rack 261 and the second rack 271 are respectively engaged with two opposite sides of the driving gear 33. Therefore, when the stepper motor 30 activates to drive the driving gear 33 to rotate, the driving gear 33 of the stepper motor 30 can directly drive the first substrate 26 and the second substrate 27 to move oppositely with respect to each other through the first rack 261 and the second rack 271 so as to switch the infrared filter 21 or the light transmissive sheet 22 to cover the photosensitive surface 12 of the photosensitive element 11.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A camera device comprising:

a circuit board having a photosensitive element, wherein the photosensitive element has a photosensitive surface;

a movable member on the circuit board, wherein the movable member comprises an infrared filter; and a stepper motor directly or indirectly connected to the movable member, wherein the stepper motor is configured to drive the movable member to move between a first position and a second position with respect to the circuit board; when the movable member is at the first position, the infrared filter covers the photosensitive surface; when the movable member is at the second position, the infrared filter does not cover the photosensitive surface;

wherein the movable member comprises a substrate and an extension plate, the substrate has a first hollow hole and a side edge, the infrared filter is fixed in the first hollow hole, the extension plate extends from the side edge and is adjacent to one end of the side edge, so that a notch is formed between the side edge and the extension plate; when the movable member is moved to the first position, the stepper motor is outside the notch; and during the process that the movable member is moved from the first position to the second position, the movable member is moved toward the stepper motor, so that the stepper motor is within the notch.

2. The camera device according to claim 1, wherein the stepper motor further comprises a shaft and a swing arm, one of two ends of the swing arm is connected to the shaft, the other end of the swing arm has a guiding post, the movable member has an elongated groove, and the guiding post of the swing arm is slidably and pivotally disposed in the elongated groove.

3. The camera device according to claim 2, wherein the movable member has a moving direction, the elongated groove has an extension direction, and the extension direction is perpendicular to the moving direction.

4. The camera device according to claim 1, wherein the stepper motor comprises a driving gear, the movable member has a rack, and the driving gear is engaged with the rack so that the driving gear drives the movable member to move with respect to the circuit board.

5. The camera device according to claim 1, wherein the stepper motor is connected to the movable member through a transmission member.

6. The camera device according to claim 5, wherein the stepper motor comprises a driving gear, the transmission member comprises a driven gear and a swing arm, the driving gear is engaged with the driven gear, one of two ends of the swing arm is connected to the driven gear, the other end of the swing arm has a guiding post, the movable member has an elongated groove, and the guiding post of the swing arm is slidably and pivotally disposed in the elongated groove.

7. The camera device according to claim 1, wherein the movable member comprises a light transmissive sheet; when the movable member is at the second position, the light transmissive sheet covers the photosensitive surface.

8. The camera device according to claim 7, wherein the substrate has a second hollow hole, the first hollow hole and the second hollow hole are spaced apart from each other, and the light transmissive sheet is in the second hollow hole.

9. A camera device comprising:

a circuit board having a photosensitive element, wherein the photosensitive element has a photosensitive surface;

a movable member on the circuit board, wherein the movable member comprises an infrared filter; and a stepper motor directly or indirectly connected to the movable member, wherein the stepper motor is configured to drive the movable member to move between a first position and a second position with respect to the circuit board; when the movable member is at the first position, the infrared filter covers the photosensitive surface; when the movable member is at the second position, the infrared filter does not cover the photosensitive surface;

wherein the movable member comprises a light transmissive sheet; when the movable member is at the second position, the light transmissive sheet covers the photosensitive surface;

wherein the movable member comprises a first substrate and a second substrate, the infrared filter is on the first substrate, the light transmissive sheet is on the second substrate, the stepper motor is connected to the first substrate and the second substrate so that the stepper motor drives the first substrate and the second substrate to move with respect to each other;

wherein the stepper motor comprises a driving gear, the first substrate has a first rack, the second substrate has a second rack, and the first rack and the second rack are respectively engaged with two opposite sides of the driving gear.

* * * * *